Aug. 23, 1966  H. Y. KUHL ETAL  3,267,943
EGG WASHING EQUIPMENT
Filed Jan. 11, 1965  2 Sheets-Sheet 2

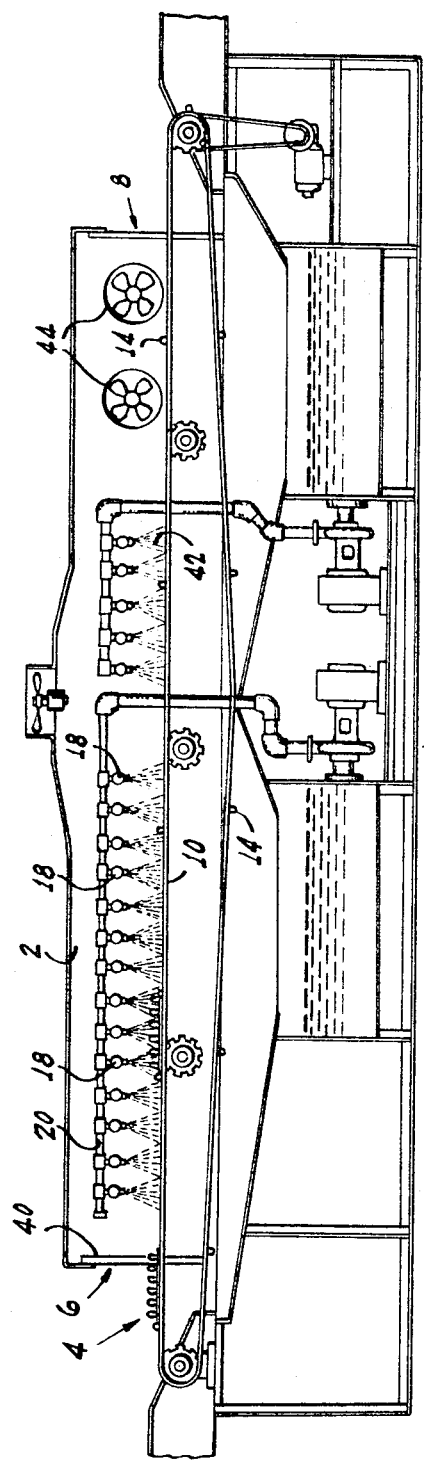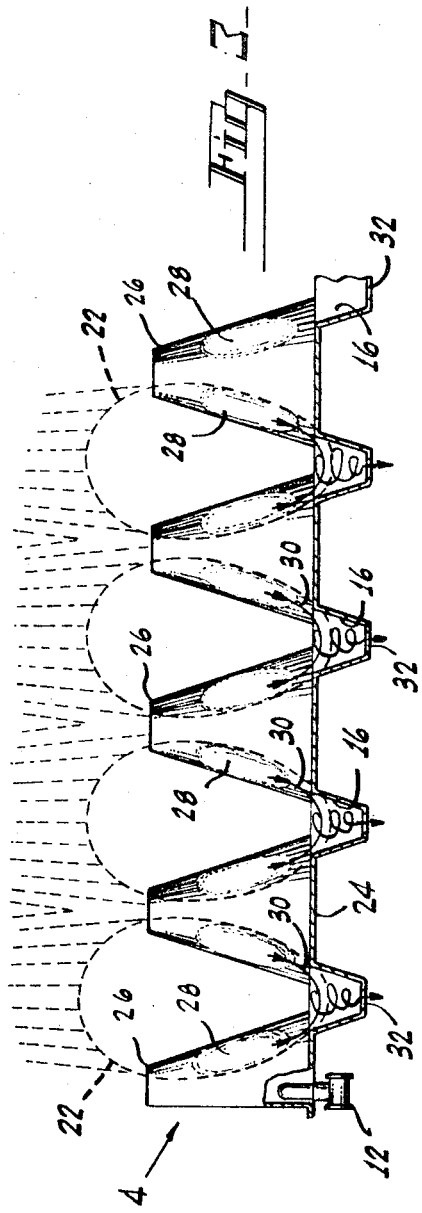

INVENTORS
HENRY Y. KUHL &
PAUL R. KUHL
BY Albert Sperry
ATTORNEY

United States Patent Office 3,267,943
Patented August 23, 1966

3,267,943
EGG WASHING EQUIPMENT
Henry Y. Kuhl and Paul R. Kuhl, both of
Copper Hill-Reaville Road, Flemington, N.J.
Filed Jan. 11, 1965, Ser. No. 424,674
4 Claims. (Cl. 134—72)

This invention relates to methods and means for washings eggs or other articles and is directed particularly to constructions wherein the eggs or the like being washed are supported in receptacles presenting recesses which are closed about the sides but have an opening in the bottom of the recess.

In our U.S. Patent No. 3,049,135, methods and means for washing eggs are described wherein the eggs are supported in trays formed of plastic or other material which is not adversely affected by the washing liquid. The egg supporting trays used in such equipment are provided with recesses having openings about the sides thereof to permit the ready flow of liquid therethrough. Equipment of this type has been widely used and has proven highly successful. However, in some instances, and particularly when the eggs are subjected to the action of sprays or jets of water directed forcibly downward onto the eggs being washed, the lower ends of the eggs are not effectively cleaned.

In accordance with the present invention, eggs may be cleaned in a spray type washer and in a manner to insure cleaning of the ends of the eggs which are located within the recesses of a receptacle. For this purpose, the receptacle is provided with recesses which are closed about the sides but provided with a drain opening in the bottom thereof. When eggs or articles are thus supported and subjected to the action of jets or sprays of liquid projected downwardly or at an angle to the receptacles, the water is caused to enter the space between the sides of the eggs and the recesses so as to flow into the bottom of the recesses. The water then circulates or eddies about within the recess and beneath the lower end of an egg therein so as to form a vortex as it flows outward through the opening in the bottom of the recess. As a result, the water or cleaning liquid serves to scrub the lower unexposed end of the egg, and it is found in practice that the eggs tend to rise or to be lifted by the swirling water in the recesses facilitating the entry of additional liquid into the recesses and causing the eggs to wobble or move about in a manner which increases the effectiveness of the washing operation and increasing the rate at which eggs can be washed.

Accordingly, the principal objects of the present invention are to improve the effectiveness and speed at which eggs can be washed, to assure the cleaning of all portions of eggs or articles subjected to a spray or jet cleaning operation, to provide novel means and combinations for use in the washing of eggs, and to provide constructions whereby a vortex of swirling liquid may be established within a recess in a receptacle so as to scrub the lower ends of eggs and in at least some instances, to cause the eggs to be lifted and moved about within the recess of a receptacle during a spray cleaning operation.

These and other objects and features of the present invention will appear from the following description thereof wherein reference is made to the figures of the accompanying drawings.

In the drawings:

FIG. 1 is a longitudinal sectional view through a typical form of washing equipment embodying the present invention;

FIG. 3 is an enlarged sectional view illustrating the manner in which the washing liquid circulates about the eggs and within the recesses of a typical form of receptacle adapted for use in the practice of the present invention.

Figure 2:
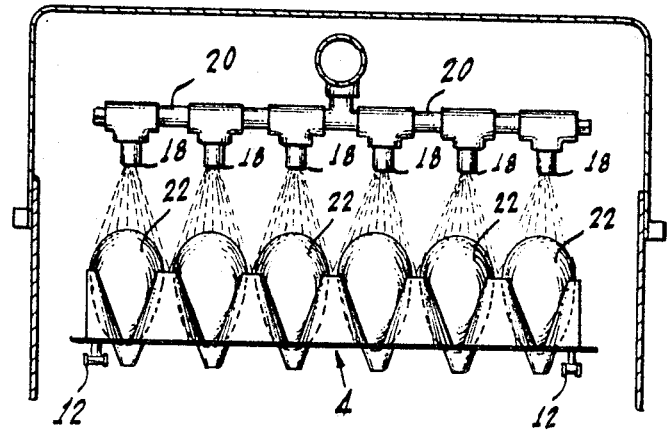
FIG. 2 is a transverse sectional view of the construction shown in FIG. 1.
Figure 4:
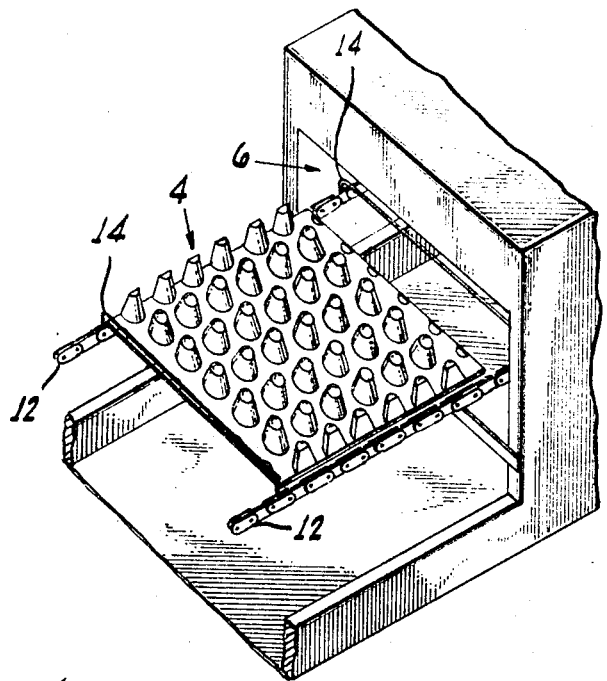
FIG. 4 is an enlarged view of a portion of the equipment illustrated in FIGS. 1 and 2.

In that form of the invention chosen for purposes of illustration in the figures of the accompanying drawing, the washer comprises an open ended chamber 2 through which egg supporting trays 4 are movable. The trays are advanced from the inlet end 6 of the chamber to the outlet end 8 thereof by a conveyor 10 which preferably is in the form of spaced chains 12 having spaced tray engaging means thereon spaced longitudinally of the chains a distance somewhat greater than the length of the trays 4. The tray engaging means as shown in FIG. 4 consist of transversely extending rods 14 which engage one end of each of the egg receiving recesses 16 of the trays to move the trays with the conveyor while preventing interference between adjacent trays in the event any tray is displaced with respect to the conveyor. However, in the alternative, the tray engaging means may be in the form of pins or the like which, as shown in FIG. 2, project upwardly from the chains 12 in position to project into an opening or other registering portion in a tray to be moved.

Within the chamber 2 of the washer are located a plurality of closely positioned longitudinally extending rows of spray nozzles 18 which receive washing liquid containing a detergent, bactericide or the like from supply pipes 20 and serve to spray the liquid forcibly downwardly and inwardly onto eggs 22 located in the recesses 16 of the trays 4. The spray nozzles preferably spray the liquid outwardly in a conical form as shown in FIGS. 2 and 3 so that every egg in each tray is subjected to numerous scrubbing jets of liquid directed at all sides and downward onto the tops of the eggs as they move beneath the jets.

As shown most clearly in FIG. 3 of the drawings, the trays 4 employed in the practice of the present invention are provided with egg receiving recesses 16 which project downwardly from the central plane 24 of the tray and have upwardly extending egg spacing cones 26 located between the recesses 16. The sides of the egg spacing cones 26 may be somewhat flattened or depressed as shown at 28 to aid in supporting and centering the eggs with respect to the recesses 16. However, it will be noted that sides of the cones 26 and the flattened or depressed portions 28 thereof, as well as the sides of the recesses 16, are closed and serve as liquid confining and directing surfaces over which the washing liquid passes downwardly into the recesses 16 as shown by the arrows 30. The sides of the recesses 16 are preferably inclined inwardly and the bottom of each recess is provided with a centrally located drain opening 32.

The construction and arrangement of the egg supporting trays and the surfaces thereof, and the relation of such surfaces with respect to the eggs and the liquid sprays, is such as to direct the liquid into the recesses and between the eggs and surfaces toward the bottoms of the recesses. At the same time, the drain opening 32 in the bottom of each recess serves to create a liquid vortex which causes the liquid in the recess and beneath the egg therein to rotate, eddy and swirl about adjacent the lower end of the egg which heretofore has not been effectively cleaned in a spray type washer. Moreover, the retarded exit of the liquid resulting from such eddying of the liquid within the recess tends to lift the egg from the surfaces of the tray by which it is supported, with the result that the egg tends to float or to move about within the recess and between the egg spacing cones 26. When this occurs, additional liquid is allowed to enter the recesses 16 and the eggs may move about on the trays so as to assure the exposure of every portion thereof to active liquid scrubbing without permitting the eggs to be actually displaced on the trays or with respect to each other.

The trays of eggs to be washed in this manner are deposited on the conveyor 10 in advance of the inlet end 6 of the chamber 2 and are moved past a flexible shield 40 into position to be subjected to liquid spray from the nozzles 18. As they pass on through the chamber, the liquid is directed onto the eggs at different angles; and as the eggs and trays move toward the outlet end 8 of the chamber, they may be washed with clean water from further sprays 42 to remove the detergent or washing liquid therefrom. Further, the eggs may be dried by means of blowers 44 so that they will pass out of the chamber 2 in a cleaned dried condition.

In some instances, it has been found advantageous to advance the conveyor 10 and the egg supporting trays 4 through the chamber 2 in a step-by-step or interrupted manner and for this purpose, any suitable or preferred means may be employed for actuating the conveyor.

When employing egg washing equipment embodying the present invention, it has been found that the eggs may be cleaned much more effectively and rapidly than heretofore. In fact, the capacity of the egg cleaning equipment has been increased from 15 cases per hour to 60 cases per hour whereas the length of the chamber in which the eggs are cleansed may be less than half that of equivalent equipment heretofore employed. Moreover, it is possible to effect a substantial saving in the amount of water and cleaning liquid employed to clean a given number of eggs may be reduced from about 150 seconds to about 40 seconds. This reduction in time of the cleaning operation is also of importance for the reason that the washing liquid is usually heated and the temperature of the eggs is raised considerably during prolonged treatment with a resulting tendency to "cook" the eggs or cause deterioration thereof. The time and amount of cooling action required to reduce the temperature of the eggs sufficiently for packing or other handling thereof is also reduced.

While a particular form of conveyor, spray device, tray and other elements have been shown in the drawings and described above, it will be apparent that numerous changes and modifications may be made in the form, construction and arrangement thereof. It should, therefore, be understood that the particular embodiment of the invention disclosed is intended to be illustrative only and is not intended to limit the scope of the invention.

We claim:

1. Egg washing equipment comprising a chamber, conveying means movable through the chamber, egg supporting trays removably supported on the conveying means and movable therewith through said chamber, said trays having upwardly facing egg receiving recesses therein which are closed about the sides and provided with a discharge opening in the bottom thereof, said trays also having generally conical egg spacing projections extending above the recesses adjacent the sides of the recesses with said projections presenting closed downwardly inclined surfaces for directing liquid into the recesses, and liquid spraying means located above the trays and conveying means in position to project liquid downward onto and about eggs located in said recesses and over the inclined surfaces of the egg spacing projections into said recesses for discharge through the openings in the bottoms of the recesses.

2. Egg washing equipment as defined in claim 1 wherein the conveying means has elements thereon engageable with said trays to hold the trays in spaced relation on the conveying means during movement of the trays through said chamber.

3. Egg washing means as defined in claim 1 wherein the conveying means is advanced step by step through the chamber.

4. Egg washing means as defined in claim 1 wherein the conical projections on the trays adjacent the upper edges of the recesses present flattened surfaces facing toward the recesses in the trays.

References Cited by the Examiner
UNITED STATES PATENTS

| | | | |
|---|---|---|---|
| 2,662,659 | 12/1953 | Putnam | 217—26.5 |
| 3,044,474 | 7/1962 | Veeder | 134—154 X |
| 3,049,135 | 8/1962 | Kuhl et al. | 134—72 |
| 3,203,435 | 8/1965 | Kurtz | 134—131 X |

CHARLES A. WILLMUTH, *Primary Examiner.*